US012263691B2

(12) United States Patent
Tsujioka

(10) Patent No.: US 12,263,691 B2
(45) Date of Patent: Apr. 1, 2025

(54) ROLLER CLEANING MECHANISM AND IMAGE FORMATION APPARATUS THEREWITH

(71) Applicant: KYOCERA Document Solutions Inc., Osaka (JP)

(72) Inventor: Koji Tsujioka, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 18/598,388

(22) Filed: Mar. 7, 2024

(65) Prior Publication Data

US 2024/0308255 A1 Sep. 19, 2024

(30) Foreign Application Priority Data

Mar. 15, 2023 (JP) ................................. 2023-040525

(51) Int. Cl.
*B41J 29/17* (2006.01)
*B41J 13/02* (2006.01)
(Continued)

(52) U.S. Cl.
CPC ............. *B41J 29/17* (2013.01); *B41J 13/025* (2013.01); *B41J 13/03* (2013.01); *B65H 5/06* (2013.01); *G03G 15/0225* (2013.01); *G03G 15/0258* (2013.01); *G03G 15/161* (2013.01); *G03G 15/166* (2013.01); *G03G 15/168* (2013.01);
(Continued)

(58) Field of Classification Search
CPC .......... B41J 29/17; B41J 13/025; B41J 13/03; B65H 5/06; B65H 2301/531; G03G 15/0225; G03G 15/0258; G03G 15/161; G03G 15/166; G03G 15/168; G03G 15/2025; G03G 15/6529; G03G 21/00; G03G 21/1661; G03G 21/169; G03G 21/1695; G03G 21/1814; G03G 2215/00708; G03G 2215/0805;
(Continued)

(56) References Cited

U.S. PATENT DOCUMENTS 6,055,407 A * 4/2000 Inoue ................. G03G 15/6511 271/119
2007/0231033 A1* 10/2007 Okazaki ............ G03G 15/6511 399/388
2013/0142540 A1* 6/2013 Kaneko .............. G03G 15/0189 399/101

FOREIGN PATENT DOCUMENTS

JP H 07-69474 A 3/1995
JP 2018-127326 A 8/2018

* cited by examiner

*Primary Examiner* — Joseph S Wong
(74) *Attorney, Agent, or Firm* — Stein IP, LLC

(57) ABSTRACT

A roller cleaning mechanism includes a cleaning member making contact with a conveying roller, a holder holding the cleaning member, a housing for the holder, and an urging member. The holder is supported on the housing swingably about a swing shaft parallel to the axial direction of a driving roller. The urging member urges the holder oppositely to the rotation direction of the conveying roller. When the conveying roller rotates, its rotative driving force keeps the holder at a cleaning position where a cleaning face of the cleaning member makes contact with the outer circumferential face of the conveying roller. When the conveying roller is halted, the urging force of the urging member keeps the holder at a retracted position where a part of the cleaning member different from the cleaning face makes contact with the outer circumferential face of the conveying roller.

7 Claims, 5 Drawing Sheets

(51) Int. Cl.
*B41J 13/03* (2006.01)
*B65H 5/06* (2006.01)
*G03G 15/00* (2006.01)
*G03G 15/02* (2006.01)
*G03G 15/16* (2006.01)
*G03G 15/20* (2006.01)
*G03G 21/00* (2006.01)
*G03G 21/16* (2006.01)
*G03G 21/18* (2006.01)

(52) U.S. Cl.
CPC ..... *G03G 15/2025* (2013.01); *G03G 15/6529* (2013.01); *G03G 21/00* (2013.01); *G03G 21/1661* (2013.01); *G03G 21/169* (2013.01); *G03G 21/1695* (2013.01); *G03G 21/1814* (2013.01); *B65H 2301/531* (2013.01); *G03G 2215/00708* (2013.01); *G03G 2215/0805* (2013.01); *G03G 2215/1647* (2013.01); *G03G 2215/1652* (2013.01); *G03G 2215/1657* (2013.01)

(58) Field of Classification Search
CPC ... G03G 2215/1647; G03G 2215/1652; G03G 2215/1657
See application file for complete search history.

ROLLER CLEANING MECHANISM AND IMAGE FORMATION APPARATUS THEREWITH

INCORPORATION BY REFERENCE

This application is based upon and claims the benefit of priority from the corresponding Japanese Patent Application No. 2023-040525 filed on Mar. 15, 2023, the entire contents of which are hereby incorporated by reference.

BACKGROUND

The present disclosure relates to a roller cleaning mechanism for cleaning rollers used in image forming apparatuses such as copiers, facsimile machines, and printers.

Conventional image forming apparatuses using an electrophotographic system or an ink-jet system include a paper dust removing member that makes contact with conveying rollers such as a pair of registration rollers provided in a sheet conveying path. The paper dust removing member removes paper dust adhering to the surface of the roller to prevent failure due to paper dust from occurring during image formation.

Here, if the paper dust removing member is constantly in contact with the conveying roller at the same position, the paper dust removing member is deformed over time and loses its contact force. This makes it difficult to sufficiently remove paper dust adhering to the conveying roller, possibly leading to image defects caused by paper dust entering an image forming portion.

SUMMARY

According to one aspect of the present disclosure, a roller cleaning mechanism includes a cleaning member, a holder, a housing, and an urging member and removes foreign matter adhering to the outer circumferential face of a conveying roller. The cleaning member makes contact with, along the axial direction of, the conveying roller for conveying a sheet. The holder holds the cleaning member. The housing houses the holder. The holder is supported so as to be swingable with respect to the housing about a swing shaft parallel to the axial direction of the driving roller. The urging member urges the holder in the direction opposite to the rotation direction of the conveying roller. When the conveying roller rotates, the holder swings in the rotation direction of the conveying roller with a rotative driving force of the conveying roller that is stronger than the urging force of the urging member so as to be arranged at a cleaning position where a cleaning face of the cleaning member makes contact with the outer circumferential face of the conveying roller. When the conveying roller is halted, the holder swings in the direction opposite to the rotation direction of the conveying roller by the urging force of the urging member so as to be arranged at a retracted position where a part of the cleaning member different from the cleaning face makes contact with the outer circumferential face of the conveying roller.

DETAILED DESCRIPTION

Figure 1:
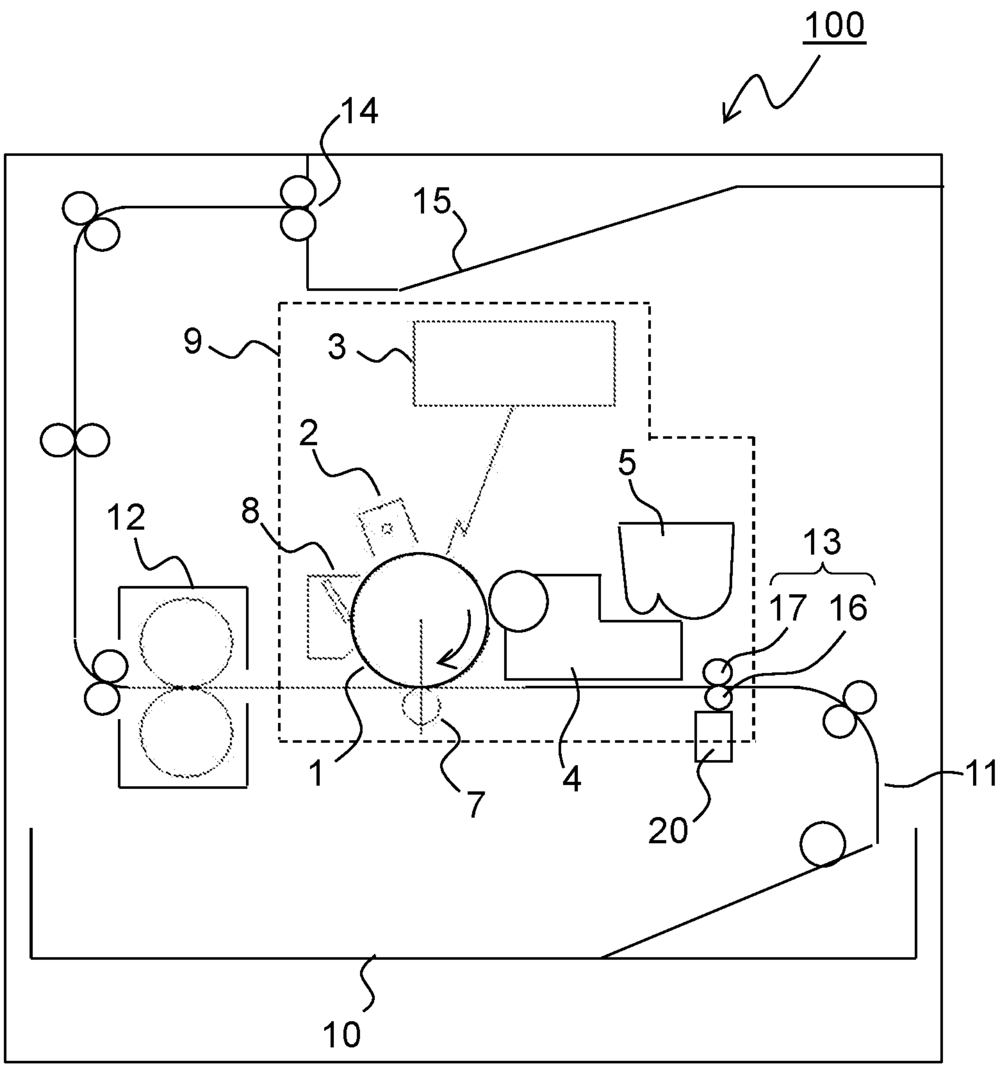
FIG. 1 is a schematic sectional view of an image forming apparatus including a roller cleaning mechanism according to the present disclosure.

Hereinafter, with reference to the accompanying drawings, embodiments of the present disclosure will be described. FIG. 1 is a schematic sectional view of an image forming apparatus 100 mounted with a roller cleaning mechanism 20 according to the present disclosure. In the image forming apparatus (for example, a monochrome printer) 100, when an image formation operation is performed, an electrostatic latent image based on document image data transmitted from an unillustrated personal computer or the like is formed in an image forming portion 9 inside the image forming apparatus 100, and a developing device 4 attaches toner to the electrostatic latent image to form a toner image. The toner is fed to the developing device 4 from a toner container 5. The image forming apparatus 100, while rotating a photosensitive drum 1 clockwise in FIG. 1, executes an image forming process with respect to the photosensitive drum 1.

In the image forming portion 9, there are provided, along the rotation direction of the photosensitive drum 1 (clockwise), a charging portion 2, an exposure unit 3, the developing device 4, a transfer roller 7, a cleaning device 8, and a static eliminator (unillustrated). The photosensitive drum 1 is, for example, an aluminum drum coated with a photosensitive layer. There is no particular restriction on the photosensitive layer, which preferably is, for example, a layer of amorphous silicon (a-Si) which excels in durability or an organic photosensitive layer (OPC) which generates little ozone when electrically charged and which offers a high-resolution image.

The charging portion 2 electrostatically charges the photosensitive layer on the surface of the photosensitive drum 1 uniformly. Used as the charging portion 2 is, for example, a corona discharge device which causes electric discharge by application of a high voltage to a thin piece of wire acting as an electrode. Usable instead of the corona discharge device is a contact-type charging device which applies a voltage while keeping the surface of the photosensitive drum 1 in contact with a charging member as exemplified by a charging roller. The exposure unit 3 irradiates the surface of the photosensitive drum 1 that is electrostatically charged by the charging portion 2 with a light beam (for example, a laser beam) based on image data, and forms an electrostatic latent image on the surface of the photosensitive layer of the photosensitive drum 1 by attenuating the electrostatic charge.

The developing device 4 forms a toner image by attaching toner to the electrostatic latent image formed on the photosensitive drum 1. Here, one-component developer (hereinafter also referred to simply as toner) containing a magnetic toner component alone is contained in the developing device 4. The transfer roller 7 transfers the toner image formed on the surface of the photosensitive drum 1 to sheet conveyed through a sheet conveying passage 11. The cleaning device 8 is provided with a cleaning roller, a blade, or the like that makes line contact with the photosensitive drum 1 in its longitudinal direction, and removes unused toner on the surface of the photosensitive drum 1 after the transfer of the toner image to the sheet.

A pair of registration rollers 13 in a halted state has a leading edge of a sheet fed from the sheet storage portion 10 butted against it and thereby corrects skew in the sheet, and feeds the sheet again in coordination with the timing of image formation in the image forming portion 9. The pair of registration rollers 13 is composed of a driving roller 16 and a driven roller 17 that face each other while in contact with each other. The driving roller 16 rotates with a rotative driving force that is applied from a motor (not shown) to a rotary shaft 16*a* (see FIG. 2). The driven roller 17 rotates by following the driving roller 16 as the driving roller 16 is driven to rotate. Below the pair of registration rollers 13, the roller cleaning mechanism 20 that cleans the driving roller 16 is arranged.

When image formation is performed, first, the charging portion 2 electrostatically charges the surface of the photosensitive drum 1 uniformly. Then, the exposure unit 3 irradiates the photosensitive drum 1 with a laser beam (rays of light) based on previously entered image data, and thereby forms an electrostatic latent image based on the image data on the surface of the photosensitive drum 1. Thereafter, the developing device 4 attaches toner to the electrostatic latent image to form a toner image.

Toward the image forming portion 9 where the toner image has been formed as described above, a sheet is conveyed with predetermined timing from a sheet storage portion 10 via the sheet conveying passage 11 and the pair of registration rollers 13, so that, in the image forming portion 9, the transfer roller 7 transfers the toner image on the surface of the photosensitive drum 1 to the sheet. Then, the sheet having the toner image transferred to it is separated from the photosensitive drum 1, and is conveyed to a fixing portion 12, where, under application of heat and pressure, the toner image is fixed to the sheet. The sheet having passed through the fixing portion 12 passes between a pair of discharge rollers 14, and is discharged onto a sheet discharge portion 15.

Figure 2:
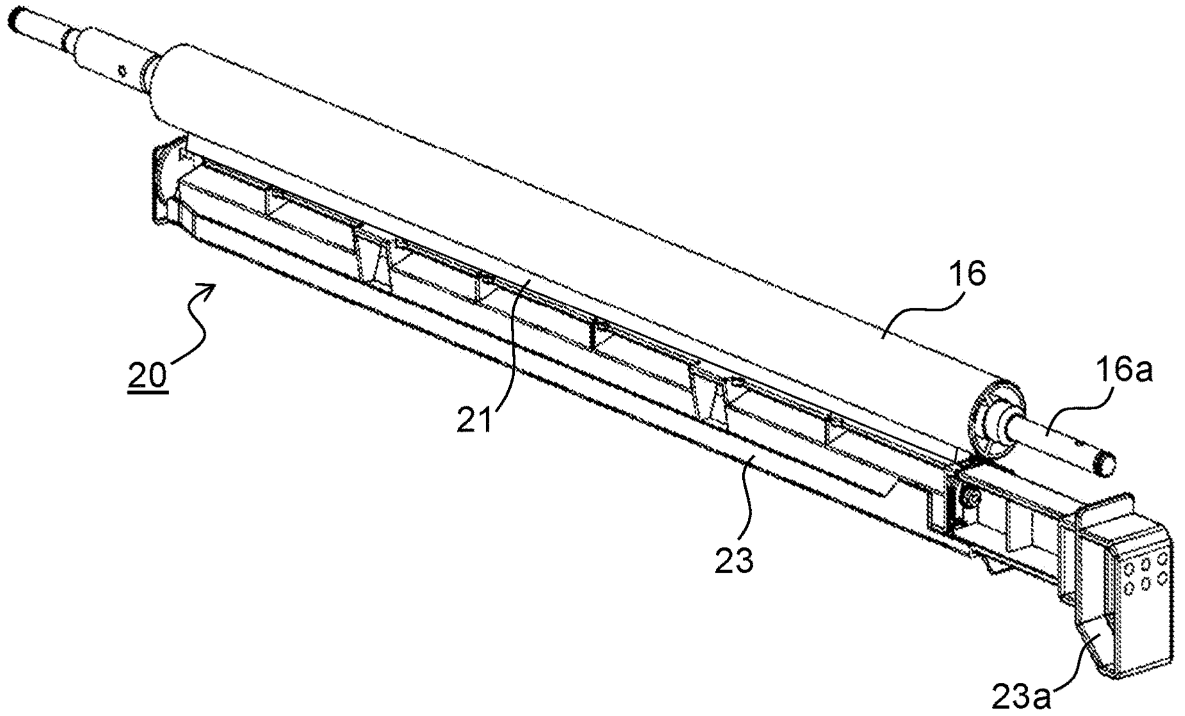
FIG. 2 is a perspective view of a driving roller in a pair of registration rollers along with a roller cleaning mechanism according to a first embodiment of the present disclosure for cleaning the driving roller.
Figure 3:
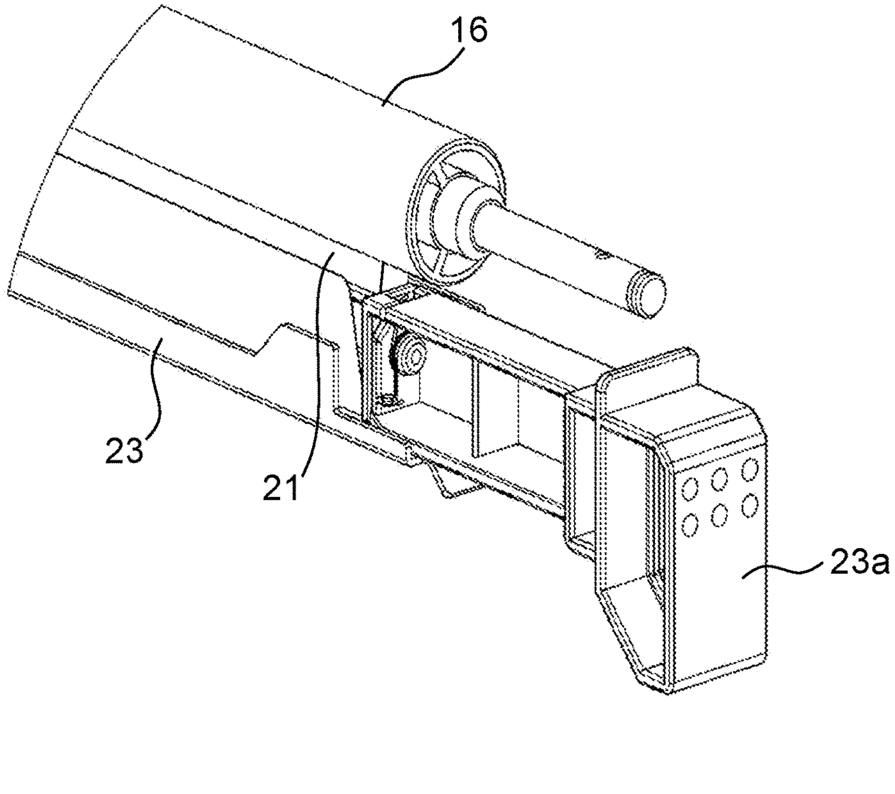
FIG. 3 is an enlarged part view of the driving roller and the roller cleaning mechanism of the first embodiment at one end, illustrating a state where the driving roller is rotating.
Figure 4:
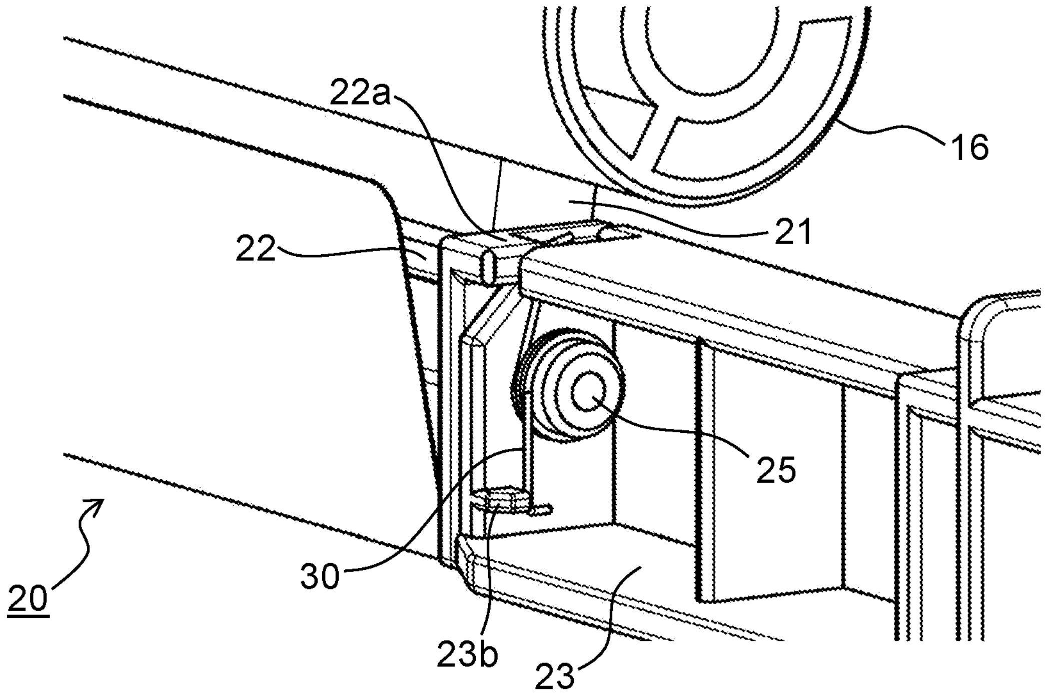
FIG. 4 is an enlarged perspective view of a coupling portion between a holder and a housing in the roller cleaning mechanism of the first embodiment, illustrating a state where the driving roller is rotating.
Figure 5:
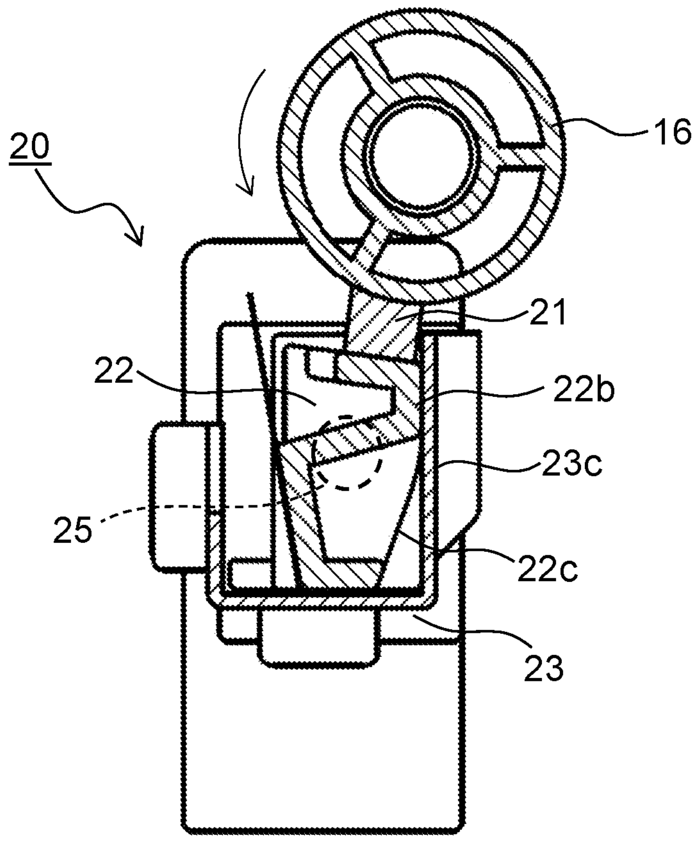
FIG. 5 is a cross-sectional side view of the holder and the housing in the roller cleaning mechanism of the first embodiment as seen along a swing shaft, illustrating a state where the driving roller is rotating.

Next, the structure of the roller cleaning mechanism 20 will be described in detail. FIG. 2 is a perspective view of the driving roller 16 in the pair of registration rollers 13 along with the roller cleaning mechanism 20 according to a first embodiment of the present disclosure for cleaning the driving roller 16. FIG. 3 is an enlarged part view of the driving roller 16 and the roller cleaning mechanism 20 of the first embodiment at one end (on the near right side in FIG. 2). FIG. 4 is an enlarged perspective view of a coupling portion between a holder 22 and a housing 23 in the roller cleaning mechanism 20 of the first embodiment. FIG. 5 is a cross-sectional side view of the holder 22 and the housing 23 in the roller cleaning mechanism 20 of the first embodiment as seen along a swing shaft 25. The roller cleaning mechanism 20 includes a paper dust removing member (cleaning member) 21, a holder 22, and a housing 23.

The paper dust removing member 21 is a square columnar member that extends along the axial direction of the driving roller 16. The paper dust removing member 21 is formed of, for example, a foamed elastic material such as sponge. As the driving roller 16 rotates with the paper dust removing member 21 in contact with the outer circumferential face of the driving roller 16, foreign matter such as paper dust adhering to the outer circumferential face of the driving roller 16 is scraped off by the paper dust removing member 21.

The holder 22 removably holds the paper dust removing member 21. The holder 22 is supported so as to be swingable with respect to the housing 23 about a swing shaft 25 (see FIG. 4) parallel to the axial direction of the driving roller 16. As the holder 22 swings, the paper dust removing member 21 held by the holder 22 moves along the circumferential direction of the driving roller 16.

The housing 23 houses the holder 22. In an end part of the housing 23 on the device front side (on the near right side in FIG. 2), a handle 23*a* is formed. When the paper dust removing member 21 wears due to durable printing, the housing 23 is drawn out of the image forming apparatus 100 with the handle 23*a* held by hand, and, the paper dust removing member 21 is removed from the holder 22 and is replaced with a new paper dust removing member 21.

As shown in FIG. 4, the swing shaft 25 is fitted with a torsion spring (urging member) 30. One end (lower end in FIG. 4) of the torsion spring 30 is locked on a spring locking portion 23*b* in the housing 23. The other end (upper end in FIG. 4) of the torsion spring 30 makes contact with a pressed portion 22*a* of the holder 22. Thus, the holder 22 is urged in the direction opposite to the rotation direction of the driving roller 16 (counter-clockwise in FIG. 4) by the urging force of the torsion spring 30.

As shown in FIG. 5, the holder 22 has a first regulating face 22*b* and a second regulating face 22*c*. The first regulating face 22*b* and the second regulating face 22*c* face an inner face 23*c* of the housing 23 at different angles.

FIGS. 2 to 5 show a state where the driving roller 16 is rotating in a sheet feeding direction (counter-clockwise in FIG. 5). As the driving roller 16 rotates, the friction force acting between the outer circumferential face of the driving roller 16 and the paper dust removing member 21 produces a force that tends to swing the holder 22 clockwise. The friction force is stronger than the urging force of the torsion spring 30, and thus the holder 22 swings clockwise.

As shown in FIG. 5, when the first regulating face 22*b* of the holder 22 makes contact with the inner face 23*c* of the housing 23, the holder 22 stops swinging and the holder 22 is arranged at a position (cleaning position) where the top face (cleaning face) of the paper dust removing member 21 makes contact with the outer circumferential face of the driving roller 16. As the driving roller 16 rotates in this state, the paper dust removing member 21 rubs against the outer circumferential face of the driving roller 16 to remove foreign matter such as paper dust.

Figure 6:
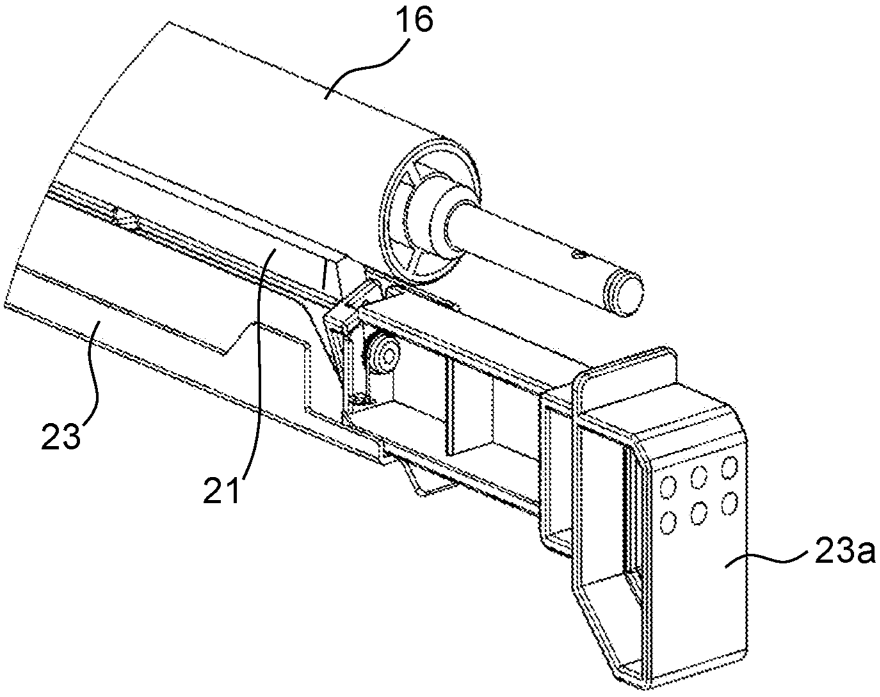
FIG. 6 is an enlarged part view of the driving roller and the roller cleaning mechanism of the first embodiment at one end, illustrating a state where the driving roller is halted.
Figure 7:
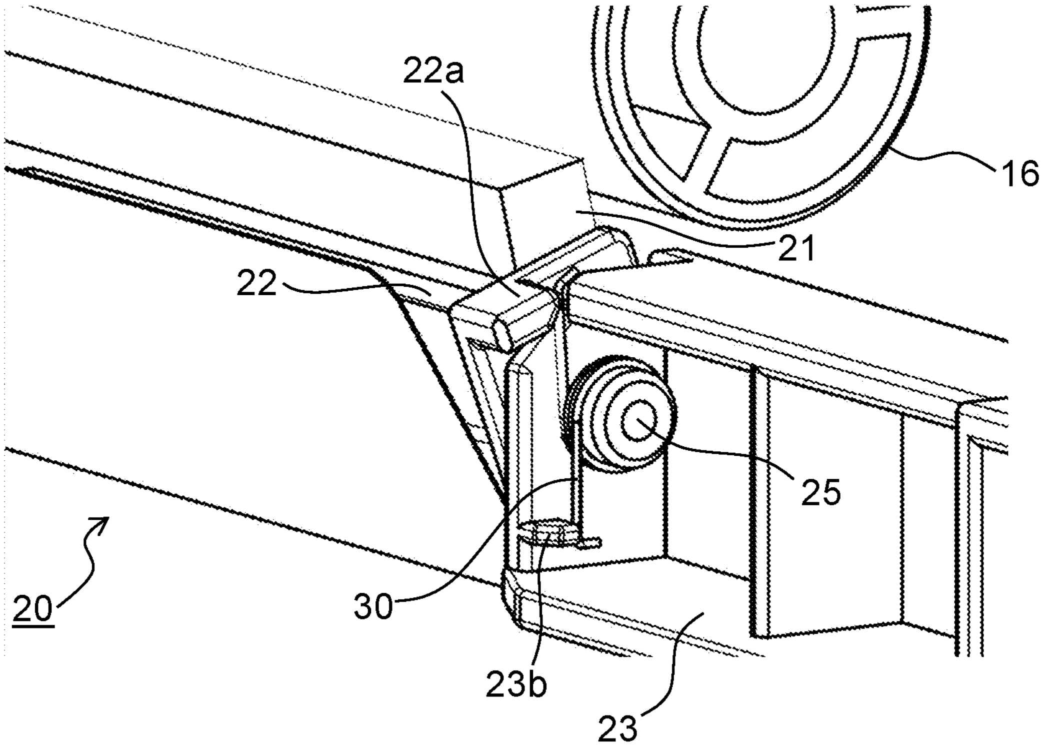
FIG. 7 is an enlarged perspective view of the coupling portion between the holder and the housing of the roller cleaning mechanism of the first embodiment, illustrating a state where the driving roller is halted.
Figure 8:
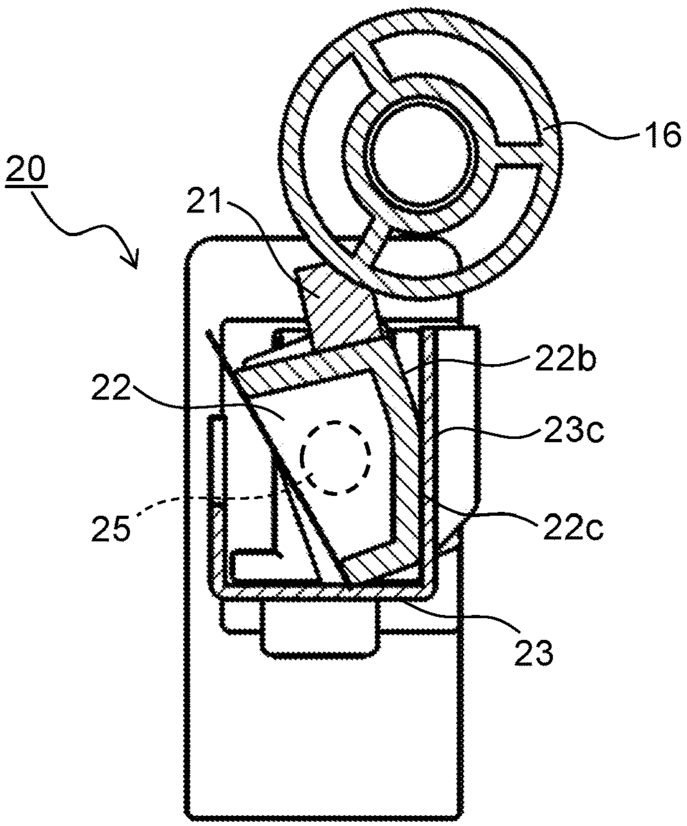
FIG. 8 is a cross-sectional side view of the holder and the housing of the roller cleaning mechanism of the first embodiment as seen along the swing shaft, illustrating a state where the driving roller is halted.

Next, a state where the driving roller 16 is halted will be described. FIG. 6 is an enlarged part view of the driving roller 16 and the roller cleaning mechanism 20 of the first embodiment at one end. FIG. 7 is an enlarged perspective view of the coupling portion between the holder 22 and the housing 23 of the roller cleaning mechanism 20 of the first embodiment. FIG. 8 is a cross-sectional side view of the holder 22 and the housing 23 of the roller cleaning mechanism 20 of the first embodiment as seen along the swing shaft 25. FIGS. 6 to 8 all illustrate a state where the driving roller 16 is halted.

When the driving roller 16 is halted, no friction force acts between the outer circumferential face of the driving roller 16 and the paper dust removing member 21. Thus, under the urging force of the torsion spring 30, the holder 22 swings counter-clockwise in FIGS. 7 and 8.

As shown in FIG. 8, when the second regulating face 22*c* of the holder 22 makes contact with the inner face 23*c* of the housing 23, the holder 22 stops swinging and the holder 22 is arranged at a position (retracted position) where a corner part (right corner part in FIG. 8) of the top face of the paper dust removing member 21 makes surface contact with the outer circumferential face of the driving roller 16.

With this embodiment, the contact position (contact angle) of the paper dust removing member 21 with the driving roller 16 is changed according to whether the driving roller 16 is rotated or halted such that the top face (cleaning face) of the paper dust removing member 21 that is in contact with the driving roller 16 when the driving roller 16 rotates does not make contact with the driving roller 16 when it is halted. Thus, compared to a configuration where the paper dust removing member 21 is always in contact with the driving roller 16 at the same position, it is possible to suppress deformation of the paper dust removing member 21, and this helps maintain the paper dust removing capability of the paper dust removing member 21 over an extended period.

The holder 22 swings in coordination with rotation and halting of the driving roller 16 to change the contact position of the paper dust removing member 21; thus, there is no need for a dedicated mechanism or component to move the paper dust removing member 21. Accordingly, it is possible to reduce the number of components of the roller cleaning mechanism 20 and also to eliminate the need for electrical control.

Figure 9:
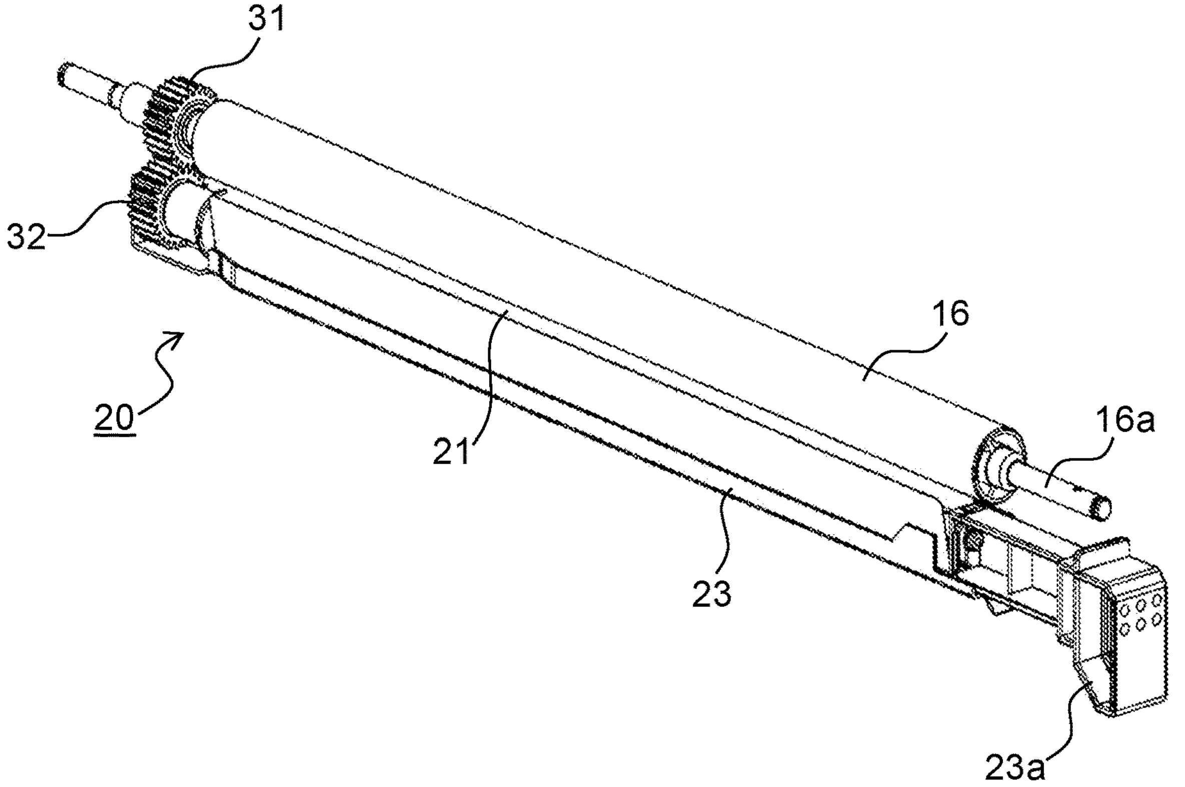
FIG. 9 is a perspective view of a driving roller along with a roller cleaning mechanism according to a second embodiment of the present disclosure.

FIG. 9 is a perspective view of the driving roller 16 along with a roller cleaning mechanism 20 according to a second embodiment of the present disclosure. In the second embodiment, at one end (on the far left side in FIG. 9) of the holder 22, a switching gear 32 that meshes with a drive input gear 31 on the driving roller 16 is provided. In other respects, the configuration of the roller cleaning mechanism 20 is similar to that in the first embodiment shown in FIGS. 3 to 8. With reference also to FIGS. 3 to 8 as necessary, a moving mechanism for the paper dust removing member 21 according to the second embodiment will be described.

When the driving roller 16 rotates, a rotative driving force is transmitted from the drive input gear 31 to the switching gear 32. The rotative driving force is stronger than the urging force of the torsion spring 30 (see FIG. 4), and thus the holder 22 swings clockwise. Then, as shown in FIG. 5, the first regulating face 22*b* of the holder 22 makes contact with the inner face 23*c* of the housing 23.

Here, the switching gear 32 is equipped with a torque limiter (not shown); thus, when the first regulating face 22*b* makes contact with the inner face 23*c* of the housing 23, the switching gear 32 rotates idly. As a result, the holder 22 ceases to swing, and the holder 22 is arranged at a position (cleaning position) where the top face (cleaning face) of the paper dust removing member 21 makes contact with the outer circumferential face of the driving roller 16.

When the driving roller 16 is halted, no rotative driving force is transmitted from the drive input gear 31 to the switching gear 32. Thus, under the urging force of the torsion spring 30, the holder 22 swings counter-clockwise in FIGS. 7 and 8.

As shown in FIG. 8, when the second regulating face 22*c* of the holder 22 makes contact with the inner face 23*c* of the housing 23, the holder 22 stops swinging and the holder 22 is arranged at the retracted position where a corner part (right corner part in FIG. 8) of the top face of the paper dust removing member 21 makes surface contact with the outer circumferential face of the driving roller 16.

With this embodiment, as with the first embodiment, the contact position (contact angle) of the paper dust removing member 21 with the driving roller 16 is changed according to whether the driving roller 16 is rotated or halted, and it is thus possible to suppress deformation of the paper dust removing member 21 and to maintain the paper dust removing capability of the paper dust removing member 21 over an extended period.

The embodiments described above are in no way meant to limit the present disclosure, which thus allows for many modifications and variations within the spirit of the present disclosure. For example, while the above embodiments deal with examples of roller cleaning mechanisms 20 for cleaning a driving roller 16 in a pair of registration rollers 13, needless to say, it can be applied also to roller cleaning mechanisms for cleaning a driven roller 17 or any other conveying rollers.

The present disclosure is applicable not only to monochrome printers like the one shown in FIG. 1 but to various types of image forming apparatuses such as digital and analog monochrome copiers, color printers, color copiers, and facsimile machines.

The present disclosure is applicable to roller cleaning mechanisms for cleaning rollers used in image forming apparatuses such as copiers, facsimile machines, and printers. Based on the present disclosure, it is possible to provide a roller cleaning mechanism that can prevent degradation in cleaning capability with a simple configuration as well as an image forming apparatus incorporating such a roller cleaning mechanism.

What is claimed is:

1. A roller cleaning mechanism comprising:

a cleaning member that makes contact with, along an axial direction of, a conveying roller for conveying a sheet;

a holder that holds the cleaning member;

a housing that houses the holder; and an urging member that urges the holder in a direction opposite to a rotation direction of the conveying roller, the roller cleaning mechanism removing foreign matter adhering to an outer circumferential face of the conveying roller, wherein the holder is supported so as to be swingable with respect to the housing about a swing shaft parallel to the axial direction of the driving roller, when the conveying roller rotates, the holder swings in the rotation direction of the conveying roller with a rotative driving force thereof that is stronger than an urging force of the urging member so as to be arranged at a cleaning position where a cleaning face of the cleaning member makes contact with the outer circumferential face of the conveying roller, and when the conveying roller is halted, the holder swings in the direction opposite to the rotation direction of the conveying roller by the urging force of the urging member so as to be arranged at a retracted position where a part of the cleaning member different from the cleaning face thereof makes contact with the outer circumferential face of the conveying roller.

2. The roller cleaning mechanism according to claim 1, wherein the holder has a first regulating face that makes contact with a part of the housing when the conveying roller rotates and a second regulating face that makes contact with a part of the housing when the conveying roller is halted, when the conveying roller rotates, the first regulating face makes contact with a part of the housing such that the holder is held at the cleaning position, and when the conveying roller is halted, the second regulating face makes contact with a part of the housing such that the holder is held at the retracted position.

3. The roller cleaning mechanism according to claim 2, wherein when the conveying roller rotates, the rotative driving force of the conveying roller is transmitted to the holder by a friction force acting between the cleaning member and the conveying roller.

4. The roller cleaning mechanism according to claim 2, wherein the holder includes a switching gear that meshes with a drive input gear on the driving roller, when the conveying roller rotates, the rotative driving force of the conveying roller is transmitted to the holder by the switching gear, and when the first regulating face makes contact with a part of the housing, a torque limiter incorporated in the switching gear lets the switching gear rotate idly so that the holder is arranged at the cleaning position.

5. The roller cleaning mechanism according to claim 1, wherein the cleaning member is formed of a foamed elastic material.

6. An image forming apparatus comprising the roller cleaning mechanism according to claim 1.

7. The image forming apparatus according to claim 6, wherein the housing can be drawn out of a main body of the image forming apparatus along the axial direction, and the housing has a grip portion formed in a downstream-side end part in a drawing direction.

* * * * *